United States Patent Office 2,906,728
Patented Sept. 29, 1959

2,906,728

VINYL AROMATIC POLYMERS STABILIZED WITH SALICYLOYLMORPHOLINES

William K. Schweitzer, Jr., Midland, Mich., assignor to The Dow Chemical Company, Midland, Mich., a corporation of Delaware No Drawing. Application August 11, 1958
Serial No. 754,172

5 Claims. (Cl. 260—45.8)

This invention concerns compositions of matter consisting essentially of polymerized monovinyl aromatic hydrocarbons and certain salicyloylmorpholines as stabilizing agents for inhibiting the polymer against the embrittling or discoloring effects of exposure to light, heat or out-of-doors weathering.

Polystyrene and other vinyl aromatic polymers are known to undergo undesirable physical changes upon prolonged exposure to light or heat. The observable symptoms of such changes are discoloration or embrittlement, or both, due in varying measure to the action of light or heat with resultant deterioration of the mechanical properties of the polymer and its appearance. Since the uses of vinyl aromatic polymers include the manufacture of molded articles and thin films, either embrittlement or discoloration of the polymers is to be avoided. The provision of stabilized compositions of vinyl aromatic polymers is the principal object of the invention.

According to the invention, the foregoing object is attained by mixing, preferably intimately incorporating, with a thermoplastic vinyl aromatic polymer from 0.5 to 5, preferably from 1 to 3 percent by weight of a compound of the class consisting of 4-salicyloylmorpholine and 4-salicyloyl-2,6-dimethylmorpholine. Articles made from the resulting composition show little or no tendency to discolor upon prolonged exposure to ultraviolet light and exhibit little tendency to become brittle as a result of such exposure.

The salicyloylmorpholine compounds can be prepared by reacting salicyloyl chloride with morpholine or 2,6-dimethylmorpholine. More specifically, salicyloyl chloride is prepared by reacting thionyl chloride with sodium salicylate in a liquid medium such as carbon tetrachloride at room temperature or thereabout, evaporating the solvent, together with volatile by-products of the reaction, on a steam or water bath at temperatures up to about 100° C., and reacting the residue or crude salicyloyl chloride with morpholine or 2,6-dimethylmorpholine at temperatures between about 25° and 100° C. The product is recovered by extracting the solid material obtained in the reaction with a dilute aqueous solution of sodium bicarbonate to remove unreacted salicylic acid, then dissolving the solid material in a dilute aqueous solution of sodium hydroxide filtering the solution to remove insoluble material and acidifying the filtrate whereby the product precipitates as a crystalline material. The product is purified in usual ways, e.g. by crystallization from ethyl alcohol.

The compounds 4-salicyloylmorpholine or 4-salicyloyl-2,6-dimethylmorpholine or mixtures thereof can be incorporated with the normally solid thermoplastic polymers of any one or more monovinyl aromatic hydrocarbons of the benzene series and are effective stabilizers for inhibiting the embrittling or discoloring effects of exposure of the polymer to heat or light, particularly ultraviolet light or light rich in ultraviolet rays, e.g. sunlight. Examples of vinyl aromatic polymers are the homopolymers of styrene, vinyltoluene, vinylxylene, ethylvinylbenzene, isopropylstyrene, ethylvinyltoluene, tert.-butylstyrene or diethylstyrene or copolymers of any two or more such monovinylaromatic hydrocarbons.

The compositions can be prepared in any of several ways, e.g. by heat-plastifying the polymer on compounding rolls, a Banbury mixer or in a plastics extruder and intimately mixing the salicyloylmorpholine compound therewith in the desired proportion, or by dissolving the polymer and the stabilizing agent in a solvent and thereafter evaporating the latter.

In practice, the polymer, e.g. polystyrene, is preferably heat-plastified and mechanically worked on compounding rolls, a Banbury mixer or in a plastics extruder, after which the salicyloylmorpholine compound is intimately incorporated therewith in the desired proportion to obtain a uniform composition. The composition is usually cooled and cut or ground to a granular form suitable for molding.

Small amounts of dyes, colors, pigments, plasticizers, flow agents, lubricants, etc., may also be incorporated with the composition, but such additives are not required in the invention. Such additives, when used, are usually employed in amounts of from 0.5 to 10 percent by weight of the polymer.

The following example illustrates a way in which the principle of the invention has been applied, but is not to be construed as limiting its scope.

Example

In each of two experiments, a mixture of one percent by weight of 4-salicyloylmorpholine and polystyrene, and a mixture of one percent by weight of 4-salicyloyl-2,6-dimethylmorpholine and polystyrene, respectively, was heat-plastified and milled on laboratory compounding rolls at temperatures between 340° F. and 240° F. for a period of about six minutes, then was removed, allowed to cool and was crushed to a granular form. Portions of the composition were injection molded to form test pieces having the dimensions 2 x 2½ inches by 0.1 inch thick. These test pieces were used to determine the effect of the added agent for inhibiting discoloring of the polystyrene upon exposure to light. The procedure for determining the inhibiting effect was to measure the amount of light of wave lengths between 420 and 620 millimicrons transmitted through a test piece as initially prepared. The difference between the percent of light transmitted at a wave length of 620 millimicrons and that transmitted at a wave length of 420 millimicrons represents a measure of the color of the polymer. The test pieces were then exposed to light from an S–1 Sunlamp (General Electric Company) for a period of 500 hours. Thereafter, the color of the polymer was measured by determining the amount of light of wave lengths between 420 and 620 millimicrons transmitted through the exposed test piece. The difference between the color of the polymer as initially prepared represents the color change or discoloration upon exposure to light. The greater the discoloration the greater is the value of the color change. For purpose of comparison, test pieces of the polystyrene without a stabilizing agent were prepared and tested under similar conditions. The results obtained were as follows:

| Added agent kind | Percent | Initial color | Final color | Color change |
|---|---|---|---|---|
| None | 0.0 | 2.0 | 12.3 | 10.3 |
| 4-salicyloylmorpholine | 1.0 | 2.4 | 7.7 | 5.3 |
| 4-salicyloyl-2,6-dimethyl-morpholine | 1.0 | 3.4 | 8.5 | 5.1 |

The 4-salicyloylmorpholine employed in the example was prepared by reacting salicyloyl chloride with morpholine in the following manner. A mixture of 357 grams of thionyl chloride and 100 grams of carbon tetrachloride was placed in a glass reaction vessel. The mixture was stirred and 160 grams of sodium salicylate was added over a period of 20 minutes at room temperature while allowing the $SO_2$ evolved in the reaction to escape from the reaction. The resulting mixture was heated in an evaporating dish on a steam bath at temperatures between 90° and 98° C. for a period of 16 hours. The residue was a mushy white solid. To this residue was added 185 grams of morpholine at room temperature with stirring. The resulting mixture was heated on a steam bath for 64 hours at temperatures between 90° and 98° C. The crude product was a solid material. It was washed with a dilute aqueous solution of sodium bicarbonate then with water. The washed material was stirred with an aqueous 10 weight percent solution of sodium hydroxide and was filtered. The filtrate was made acidic with dilute aqueous hydrochloric acid solution. The product precipitated as white crystals. It was recrystallized from ethyl alcohol. There was obtained 40 grams of 4-salicyloyl morpholine as a white crystalline product melting at 178° C. The compound 4-salicyloylmorpholine has the structural formula

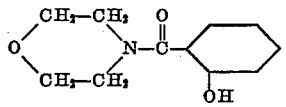

The 4-salicyloyl-2,6-dimethylmorpholine used in the example was prepared by similar procedure. The 4-salicyloyl-2,6-dimethylmorpholine was obtained as a light tan-colored crystalline product melting at 178° C. The compound 4-salicyloyl-2,6-dimethylmorpholine has the structural formula:

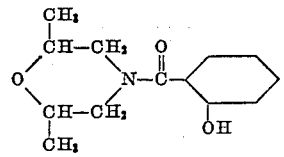

This application is a continuation-in-part of my copending application Serial No. 595,063, filed July 2, 1956, now abandoned.

I claim:
1. A composition of matter consisting essentially of a polymerized monovinyl aromatic hydrocarbon of the benzene series and, as a stabilizing agent therefor, from 0.5 to 5 percent, based on the weight of the polymer, of a compound selected from the group consisting of 4-salicyloylmorpholine and 4-salicyloyl-2,6-dimethylmorpholine.

2. A composition as claimed in claim 1, wherein the stabilizing agent is 4-salicyloylmorpholine.

3. A composition as claimed in claim 1, wherein the stabilizing agent is 4-salicyloyl-2,6-dimethylmorpholine.

4. A composition as claimed in claim 2, wherein the polymerized monovinyl aromatic hydrocarbon is polystyrene.

5. A composition as claimed in claim 3, wherein the polymerized monovinyl aromatic hydrocarbon is polystyrene.

No references cited.